(12) United States Patent
Nevraev et al.

(10) Patent No.: US 10,991,127 B2
(45) Date of Patent: *Apr. 27, 2021

(54) INDEX BUFFER BLOCK COMPRESSION

(71) Applicant: Microsoft Technology Licensing, LLC, Redmond, WA (US)

(72) Inventors: Ivan Nevraev, Sammamish, WA (US); Jason M. Gould, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,252

(22) Filed: Sep. 16, 2019

(65) Prior Publication Data

US 2020/0051286 A1 Feb. 13, 2020

Related U.S. Application Data

(63) Continuation of application No. 15/625,887, filed on Jun. 16, 2017, now Pat. No. 10,417,787.

(Continued)

(51) Int. Cl.
*G06T 9/00* (2006.01)
*G06T 1/20* (2006.01)
(Continued)

(52) U.S. Cl.
CPC ............... *G06T 9/001* (2013.01); *G06T 1/20* (2013.01); *G06T 1/60* (2013.01); *G06T 15/80* (2013.01);
(Continued)

(58) Field of Classification Search
CPC .. G06T 9/001; G06T 1/20; G06T 1/60; G06T 15/80; G06T 17/205; G06T 2210/08; G06T 2210/36; G06T 2210/52
See application file for complete search history.

(56) References Cited

U.S. PATENT DOCUMENTS

2012/0206572 A1* 8/2012 Russell ................. G06T 15/005
348/46
2012/0272309 A1* 10/2012 Zhang ................. H04L 63/0227
726/13

(Continued)

*Primary Examiner* — Grace Q Li
(74) *Attorney, Agent, or Firm* — Arent Fox, LLP

(57) ABSTRACT

Methods and devices for index buffer block compression in a computer system include a compressor in communication with a graphical processing unit (GPU). The methods and devices include selecting one or more primitives of at least a portion of a mesh formed by a total number of primitives for inclusion within a compressed index buffer block, the one or more primitives each associated with a number of indices each corresponding to a vertex within the mesh. The methods and devices may identify at least one redundant index in the number of indices associated with the one or more primitives of the compressed index buffer block. The methods and devices removing the at least one redundant index from the number of indices associated with the one or more primitives of the compressed index buffer block to form the compressed index buffer block as a set of one or more unique indices.

20 Claims, 6 Drawing Sheets

Related U.S. Application Data

(60) Provisional application No. 62/459,423, filed on Feb. 15, 2017.

(51) Int. Cl.
    *G06T 1/60*       (2006.01)
    *G06T 17/20*     (2006.01)
    *G06T 15/80*     (2011.01)

(52) U.S. Cl.
    CPC ........ *G06T 17/205* (2013.01); *G06T 2210/08* (2013.01); *G06T 2210/36* (2013.01); *G06T 2210/52* (2013.01)

(56) References Cited

U.S. PATENT DOCUMENTS

| | | | |
|---|---|---|---|
| 2014/0176589 A1* | 6/2014 | Duluk, Jr. | G09G 5/001 345/541 |
| 2015/0120797 A1* | 4/2015 | Roy | G06F 7/582 708/250 |
| 2015/0315775 A1* | 11/2015 | Schein | E04B 1/3211 52/741.1 |
| 2016/0078586 A1* | 3/2016 | Akenine-Moller | G06T 9/00 345/555 |
| 2016/0093088 A1* | 3/2016 | Shreiner | G06T 15/005 345/423 |
| 2018/0033184 A1* | 2/2018 | Jin | G06T 15/40 |

* cited by examiner

INDEX BUFFER BLOCK COMPRESSION

CROSS-REFERENCE TO RELATED APPLICATION(S)

This application is a continuation of Ser. No. 15/625,887, entitled "INDEX BUFFER BLOCK COMPRESSION, filed Jun. 16, 2017 which claims the benefit of U.S. Provisional Application Ser. No. 62/459,423, entitled "INDEX BUFFER BLOCK COMPRESSION" and filed on Feb. 15, 2017, which is expressly incorporated by reference herein in its entirety.

BACKGROUND

The present disclosure relates to computer graphics systems, and more particularly, to index buffer block compression on a computer device.

Computer graphics systems, which can render 2D objects or objects from a 3D world (real or imaginary) onto a two-dimensional (2D) display screen, are currently used in a wide variety of applications. For example, 3D computer graphics can be used for real-time interactive applications, such as video games, virtual reality, scientific research, etc., as well as off-line applications, such as the creation of high resolution movies, graphic art, etc. Typically, the graphics system includes a graphics processing unit (GPU). A GPU may be implemented as a co-processor component to a central processing unit (CPU) of the computer, and may be provided in the form of an add-in card (e.g., video card), co-processor, or as functionality that is integrated directly into the motherboard of the computer or into other devices, such as a gaming device.

Typically, the GPU has a "logical graphics pipeline," which may accept as input some representation of a 2D or 3D scene and output a bitmap that defines a 2D image for display. For example, the DIRECTX collection of application programming interfaces by MICROSOFT CORPORATION, including the DIRECT3D API, is an example of APIs that have graphic pipeline models. Another example includes the Open Graphics Library (OPENGL) API. The graphics pipeline typically includes a number of stages to convert a group of vertices, textures, buffers, and state information into an image frame on the screen. For instance, one of the stages of the graphics pipeline is a shader. A shader is a piece of code running on a specialized processing unit, also referred to as a shader unit or shader processor, usually executing multiple data threads at once, programmed to generate appropriate levels of color and/or special effects to fragments being rendered.

SUMMARY

The following presents a simplified summary of one or more features of the disclosure in order to provide a basic understanding of such features. This summary is not an extensive overview of all contemplated implementations, and is intended to neither identify key or critical elements of all implementations nor delineate the scope of any or all implementations. Its sole purpose is to present some concepts of one or more features in a simplified form as a prelude to the more detailed description that is presented later.

In one example, a method of index buffer block compression in a computer system may include selecting, at a compressor in communication with a graphics processing unit (GPU), one or more primitives of at least a portion of a mesh formed by a total number of primitives for inclusion within a compressed index buffer block, the one or more primitives each associated with a number of indices each corresponding to a vertex within the mesh. The method may further include determining, at the compressor, whether at least one redundant index has been detected in the number of indices associated with the one or more primitives of the compressed index buffer block. Moreover, the method may include, in accordance with a determination that at least one redundant index has been detected in the number of indices, removing, at the compressor, the at least one redundant index from the number of indices associated with the one or more primitives to form the compressed index buffer block as a set of one or more unique indices. Additionally, the method may include storing, in an index buffer, the compressed index buffer block.

In another example, a computer device includes a memory and a compressor in communication with a graphics processing unit (GPU) and the memory. The compressor may be configured to select one or more primitives of at least a portion of a mesh formed by a total number of primitives for inclusion within a compressed index buffer block, the one or more primitives each associated with a number of indices each corresponding to a vertex within the mesh. The compressor may further be configured to determine whether at least one redundant index has been detected in the number of indices associated with the one or more primitives of the compressed index buffer block. Additionally, the compressor may be configured to, in accordance with a determination that at least one redundant index has been detected in the number of indices, remove, at the compressor, the at least one redundant index from the number of indices associated with the one or more primitives to form the compressed index buffer block as a set of one or more unique indices. The compressor may be configured to store, in an index buffer, the compressed index buffer block.

In a further example, a computer-readable medium storing computer-executable instructions executable by a processor for index buffer block compression in a computer device includes various instructions. The computer-readable medium includes instructions for selecting one or more primitives of at least a portion of a mesh formed by a total number of primitives for inclusion within a compressed index buffer block, the one or more primitives each associated with a number of indices each corresponding to a vertex within the mesh. The computer-readable medium includes instructions for determining, at the compressor, whether at least one redundant index has been detected in the number of indices associated with the one or more primitives of the compressed index buffer block. The computer-readable medium includes instructions for instructions for, in accordance with a determination that at least one redundant index has been detected in the number of indices, removing, at the compressor, the at least one redundant index from the number of indices associated with the one or more primitives to form the compressed index buffer block as a set of one or more unique indices. The computer-readable medium includes instructions for storing, in an index buffer, the compressed index buffer block.

Additional advantages and novel features relating to implementations of the present invention will be set forth in part in the description that follows, and in part will become more apparent to those skilled in the art upon examination of the following or upon learning by practice thereof.

DESCRIPTION OF THE FIGURES

The specific features, implementations, and advantages of the disclosure will become better understood with regard to the following description, appended claims, and accompanying drawings where:

DETAILED DESCRIPTION

Figure 1:
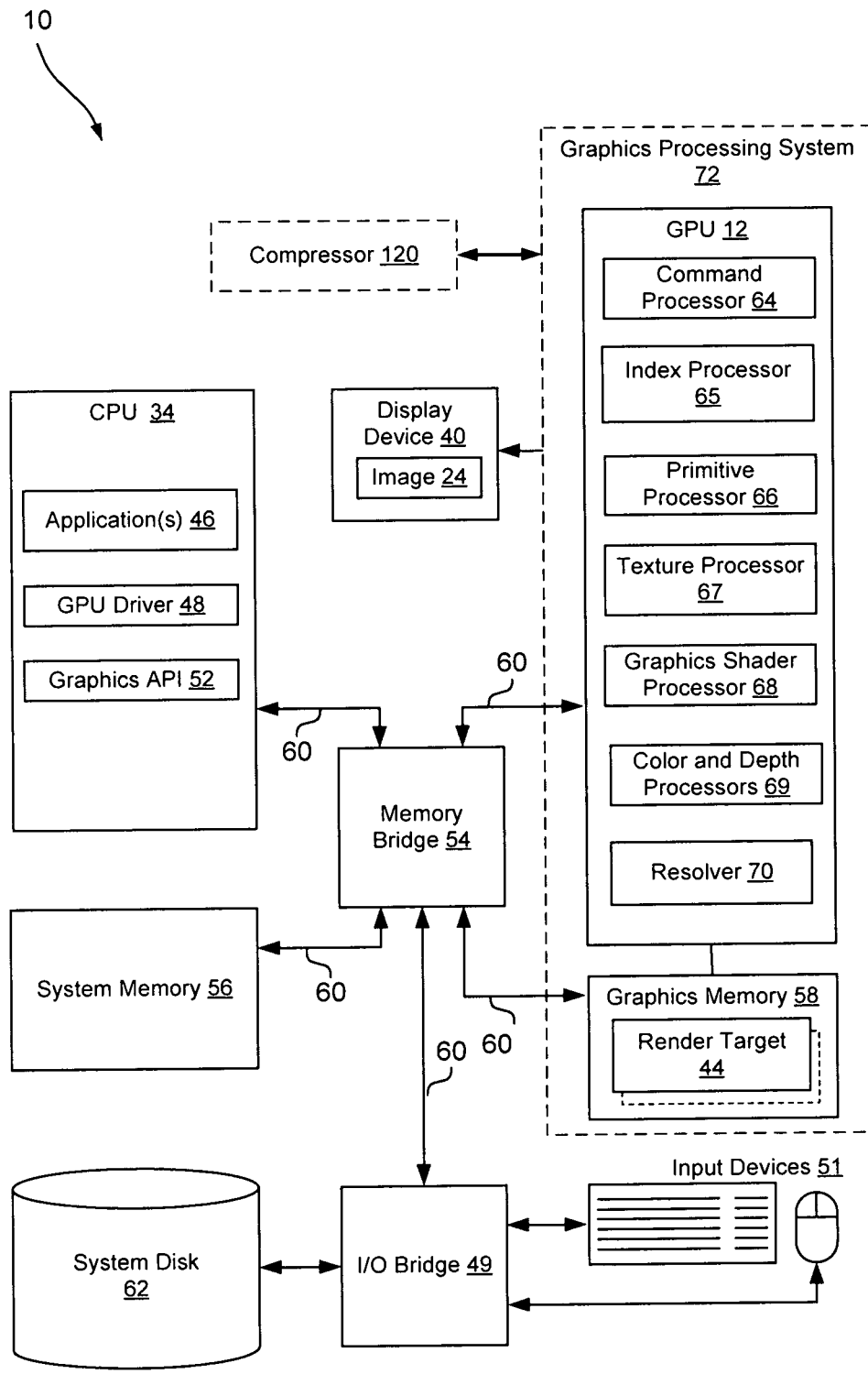
FIG. 1 is a schematic block diagram of an example architecture of a computer device including a graphics processing unit and a graphics pipeline configured according to the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some implementations, examples may be depicted with references to one or more components and one or more methods that may perform the actions or operations described herein, where components and/or actions/operations in dashed line may be optional.

The present disclosure relates to index buffer block compression in a computer graphics system. Specifically, the present disclosure may compress mesh information such as information related to primitives (e.g., triangles), vertices, and/or indices associated with the vertices into index buffer blocks, thereby increasing the speed of subsequent mesh formations from reading the compressed index buffer block and decreasing bandwidth usage during index buffer readings. In particular, some geometry processing pipelines may desire high levels of input data, e.g., incoming indices of a mesh, to support the ever-increasing speed of operations of a GPU. A mesh may be a representation of a given shape or form, including an arrangement of a finite set of geometric components (for example, indices and triangles). As the GPU performance grows, it may be desirable to have even higher throughput of indices to feed and process at the GPU. For instance, an index front end at the GPU may be able to process a given number of indices per clock cycle for outputting into a shader stage (e.g., culling) such that hardware primitive set up may be constantly fed with data. As such, the present disclosure provides an index compressor that speeds up one or more shader stages by removing processing of at least the primitive connectivity and primitive restart index in a shader stage, which may result in a more efficient per-vertex to per-triangle phase switch.

According to the present disclosure, the index processor in an index processing hardware block may receive one or more compressed index buffer blocks that include an entire wave's worth of index and connectivity data packed into a single block. This may allow efficient processing of the mesh to achieve a high wave launch rate and may simplify the transition from processing vertices-per-shader lane to processing primitives-per-shader lane in a primitive shader. By compressing index and primitive information for a wave together in one or more compressed index buffer blocks, the present disclosure may form mesh representations more efficiently. For example, the compressor (e.g., which may be considered 'offline' or separate from the shader stages) may take an original mesh's indices, process reuse indices and pack data into index chunks (e.g., blocks) that fit into a full wave. That is, the compressor may transform an original mesh's indices, and pack the resulting data into index chunks. In some implementations, determining reuse may identify one or more redundant indices among or between at least two primitives (e.g., triangles). After removing such redundancies, and in combination with using at least one delta-based index compression scheme, the vertex indices may be compressed efficiently. The present disclosure may also locate the correspondence between one or more vertices and primitives in the wave and also compress that information. Additionally reuse, topology, and primitive restart may be determined in the same process so that the index processing block may be streamlined. As such, the index processing block may simply unpack the information from the compressed index buffer blocks and form/determine the representation.

In one implementation, the present disclosure may move or integrate various shader stages, such as the compute shader, vertex shader, and/or geometry shader, into a single shader stage called a mesh shader. For example, the mesh shader may first run or process vertices per shader lane, then may switch to primitive processing without, in some implementations, processing indices in the shader. Further, to efficiently utilize each mesh shader lane, 'N' vertices and 'N' primitives may run in the same shader lane, where the value of N can be any configured number. In this example, each of the 'N' shader lanes in the hardware may process a single vertex and a single primitive. As such, to avoid index processing complications, the present disclosure may process indices 'offline,' for example, at a compressor configured as described herein. Further, the present disclosure may pre-encode one or more shader lane permutations for going from the vertex to the primitive stage. As data processing such identifying redundant indices between multiple primitives may be performed offline, or more specifically, outside of the shader stages, the compressor may process indices faster.

In particular, the present disclosure provides a compressor that may be part of or in communication with the GPU, and configured to compress mesh information such as primitives and indices into index buffer blocks. Specifically, the compressor may select one or more primitives (e.g., triangles) of at least a portion of a mesh formed by a total number of primitives for inclusion within a compressed index buffer block. The one or more primitives may each associated with a number of indices each corresponding to a vertex within the mesh. Further, the compressor may identify at least one redundant index in the number of indices associated with the one or more primitives of the compressed index buffer block. The compressor may remove the at least one redundant index from the number of indices associated with the one or more primitives of the compressed index buffer block to define or form the compressed index buffer block as a set of one or more unique indices. Additionally, the compressed index buffer block may be stored in an index buffer, which may be tagged as being stored in a compressed format so that hardware may know how to decipher it.

Referring to FIG. 1, in one example, a computer device 10 includes a graphics processing unit (GPU) 12 configured to implement the described implementations of index buffer block compression. For example, in one implementation, computer device 10 may include compressor 120, which may be configured to compress mesh information such as primitives, indices, and/or connectivity information into index buffer blocks. That is, in some implementations, compressor 120 may compress an entire index buffer 100. Further, computer device 10 may include index processor 56, which may be configured to receive and unpack the compressed index buffer blocks to form a corresponding mesh representation.

Computer device 10 may further include a CPU 34, which may be one or more processors that are specially-configured or programmed to control operation of computer device 10 according to this description. For instance, a user may provide an input to computer device 10 to cause CPU 34 to execute one or more software applications 46. Software applications 46 that execute on CPU 34 may include, for example, but are not limited to one or more of an operating system, a word processor application, an email application, a spread sheet application, a media player application, a video game application, a graphical user interface application or another program. Additionally, CPU 34 may include a GPU driver 48 that can be executed for controlling the operation of GPU 12. The user may provide input to computer device 10 via one or more input devices 51 such as a keyboard, a mouse, a microphone, a touch pad or another input device that is coupled to computer device 10 via an input/output bridge 49, such as but not limited to a southbridge chipset or integrated circuit.

The software applications 46 that execute on CPU 34 may include one or more instructions that executable to cause CPU 34 to issue one or more graphics commands 36 to cause the rendering of graphics data associated with an image 24 on display device 40. The image 24 may comprise, for example, one or more objects, and each object may be represented by a mesh of one or more primitives, as explained in more detail below. For instance, in some implementations, the software application 46 places graphics commands 36 in a buffer in the system memory 56 and the command processor 64 of the GPU 12 fetches them and may initiate one or more processes and/or components. In some examples, the software instructions may conform to a graphics application programming interface (API) 52, such as, but not limited to, a DirectX and/or Direct3D API, an Open Graphics Library (OpenGL™) API, an Open Graphics Library Embedded Systems (OpenGL ES) API, an X3D API, a RenderMan API, a WebGL API, or any other public or proprietary standard graphics API. In order to process the graphics rendering instructions, CPU 34 may issue one or more graphics commands 36 to GPU 12 (e.g., through GPU driver 48) to cause GPU 12 to perform some or all of the rendering of the graphics data. In some examples, the graphics data to be rendered may include a list of graphics primitives, e.g., points/vertices, lines, triangles, quadrilaterals, triangle strips, etc.

Computer device 10 may also include a memory bridge 54 in communication with CPU 34 that facilitates the transfer of data going into and out of system memory 56 and/or graphics memory 58. For example, memory bridge 54 may receive memory read and write commands, and service such commands with respect to system memory 56 and/or graphics memory 58 in order to provide memory services for the components in computer device 10. Memory bridge 54 is communicatively coupled to GPU 12, CPU 34, system memory 56, graphics memory 58, and input/output bridge 49 via one or more buses 60. In an implementation, for example, memory bridge 54 may be a northbridge integrated circuit or chipset.

System memory 56 may store program modules and/or instructions that are accessible for execution by CPU 34 and/or data for use by the programs executing on CPU 34. For example, system memory 56 may store the operating system application for booting computer device 10. Further, for example, system memory 56 may store a window manager application that is used by CPU 34 to present a graphical user interface (GUI) on display device 40. In addition, system memory 56 may store user applications 46 and other information for use by and/or generated by other components of computer device 10. For example, system memory 56 may act as a device memory for GPU 12 (although, as illustrated, GPU 12 may generally have a direct connection to its own graphics memory 58) and may store data to be operated on by GPU 12 as well as data resulting from operations performed by GPU 12. For example, system memory 56 may store any combination of texture buffers, depth buffers, stencil buffers, vertex buffers, frame buffers, or the like. System memory 56 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

Additionally, computer device 10 may include or may be communicatively connected with a system disk 62, such as a CD-ROM or other removable memory device. System disk 62 may include programs and/or instructions that computer device 10 can use, for example, to boot operating system in the event that booting operating system from system memory 56 fails. System disk 62 may be communicatively coupled to the other components of computer device 10 via input/output bridge 49.

As discussed above, compressor 120 and/or GPU 12 may be configured to perform index buffer block compression. For instance, when one of the software applications 46 executing on CPU 34 requires index buffer block compression, CPU 34 may provide commands and index buffer data associated with a mesh of image 24 to compressor 120 and/or GPU 12 for index buffer block compression. The graphics data may include, e.g., drawing commands, state information, primitive information, texture information, etc. GPU 12 may include one or more processors, including a command processor 64 for receiving graphics commands 36 and initiating or controlling the subsequent graphics processing by at least an index processor 65 for processing indices of vertices, such as may be associated with an input assembler stage, a primitive processor 66 for assembling primitives, a plurality of graphics shader processors 68 for processing vertex, surface, pixel, and other data for GPU 12, one or more texture processors 67 for generating texture data for fragments or pixels, and one or more color and depth processors 69 for generating color data and depth data and merging the shading output. For example, index processor 65 may implement an input assembler stage, and primitive processor 66 may implement rasterizer stages of a logical graphics pipeline, as is discussed below. In some implementations, index processor 65 may include a decompressor to decompress the compressed index buffer information and in direct communication with at least two pipeline stages (e.g., which may occur as part of the input assembler, or as part of one or more shader stages).

GPU 12 may, in some instances, be built with a highly parallel structure that provide more efficient processing of complex graphic-related operations than CPU 34. For example, GPU 12 may include a plurality of processing elements that are configured to operate on multiple vertices or pixels in a parallel manner. The highly parallel nature of GPU 12 may, in some instances, allow GPU 12 to draw graphics image 24, e.g., GUIs and two-dimensional (2D) and/or three-dimensional (3D) graphics scenes, onto display device 40 more quickly than drawing the image 24 directly to display device 40 using CPU 34.

GPU 12 may, in some instances, be integrated into a motherboard of computer device 10. In other instances, GPU 12 may be present on a graphics card that is installed in a port in the motherboard of computer device 10 or may be otherwise incorporated within a peripheral device configured to interoperate with computer device 10. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In an implementation, GPU 12 may be directly coupled to graphics memory 58. For example, graphics memory 58 may store any combination of index buffers, vertex buffers, texture buffers, depth buffers, stencil buffers, render target buffers, frame buffers, state information, shader resources, constants buffers, coarse shading rate parameter (SRP) maps (e.g., a 2D map of a viewable area at coarse resolution that can be used to look-up an SRP value based on a closest point in the map to the transformed vertex), unordered access view resources, graphics pipeline stream outputs, or the like. As such, GPU 12 may read data from and write data to graphics memory 58 without using bus 60. In other words, GPU 12 may process data locally using storage local to the graphics card, instead of system memory 56. This allows GPU 12 to operate in a more efficient manner by eliminating the need of GPU 12 to read and write data via bus 60, which may experience heavy bus traffic. In some instances, however, GPU 12 may not include a separate memory, but instead may utilize system memory 56 via bus 60. Graphics memory 58 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 34 and/or GPU 12 may store rendered image data, e.g., render targets 44, in a render target buffer of graphic memory 58. It should be noted that the render target buffer also may be an independent memory or may be allocated within system memory 56. GPU 12 may further include a resolver component 70 configured to retrieve the data from a render target buffer of graphic memory 58 and convert multisample data into per-pixel color values to be sent to display device 40 to display image 24 represented by the rendered image data. In some examples, GPU 12 may include a digital-to-analog converter (DAC) that is configured to convert the digital values retrieved from the resolved render target buffer into an analog signal consumable by display device 40. In other examples, GPU 12 may pass the digital values to display device 40 over a digital interface, such as a High-Definition Multi-media Interface (HDMI interface) or a DISPLAYPORT interface, for additional processing and conversion to analog. As such, in some cases, the combination of GPU 12, graphics memory 58, and resolver component 70 may be referred to as a graphics processing system 72.

Display device 40 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display device 40 may be integrated within computer device 10. For instance, display device 40 may be a screen of a mobile telephone. Alternatively, display device 40 may be a stand-alone device coupled to computer device 10 via a wired or wireless communications link. For instance, display device 40 may be a computer monitor or flat panel display connected to a personal computer via a cable or wireless link.

It should be noted that computer 10 and the above-described components are one non-limiting example of a computer device that can carry out the principles of the present disclosure, and that other computer devices with other components may be configured to perform the functions described herein.

According to one example of this disclosure, graphics API 52 and GPU driver 48 may configure GPU 12 to execute logical graphics pipeline (e.g., pipeline 14a of FIG. 2A or pipeline 14b of FIG. 2B) to perform index buffer block compression as described herein.

Figure 2A:
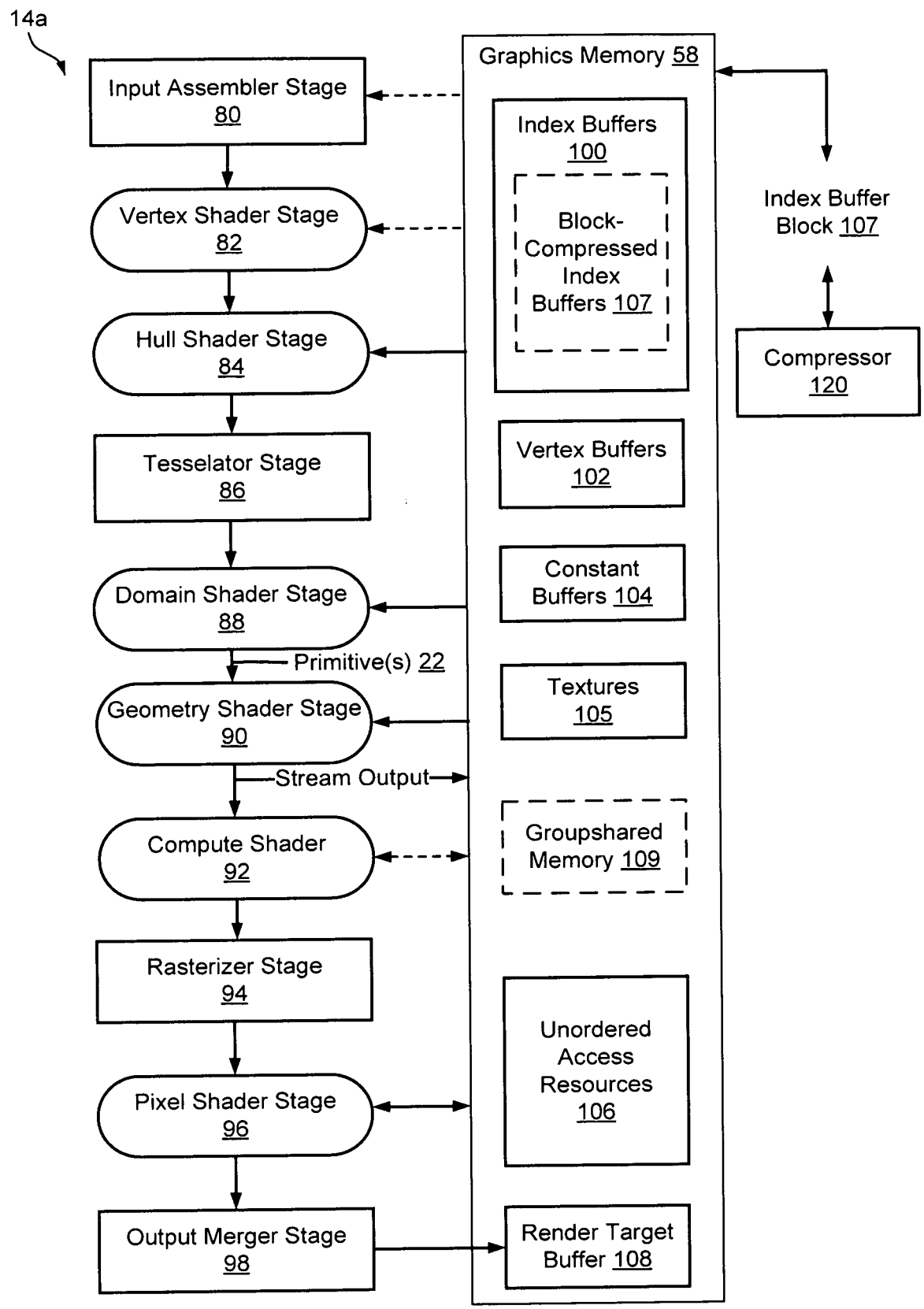
FIGS. 2A-2C are schematic diagrams of example graphics pipeline and graphics memory of the computer device of FIG. 1.
Figure 2B:
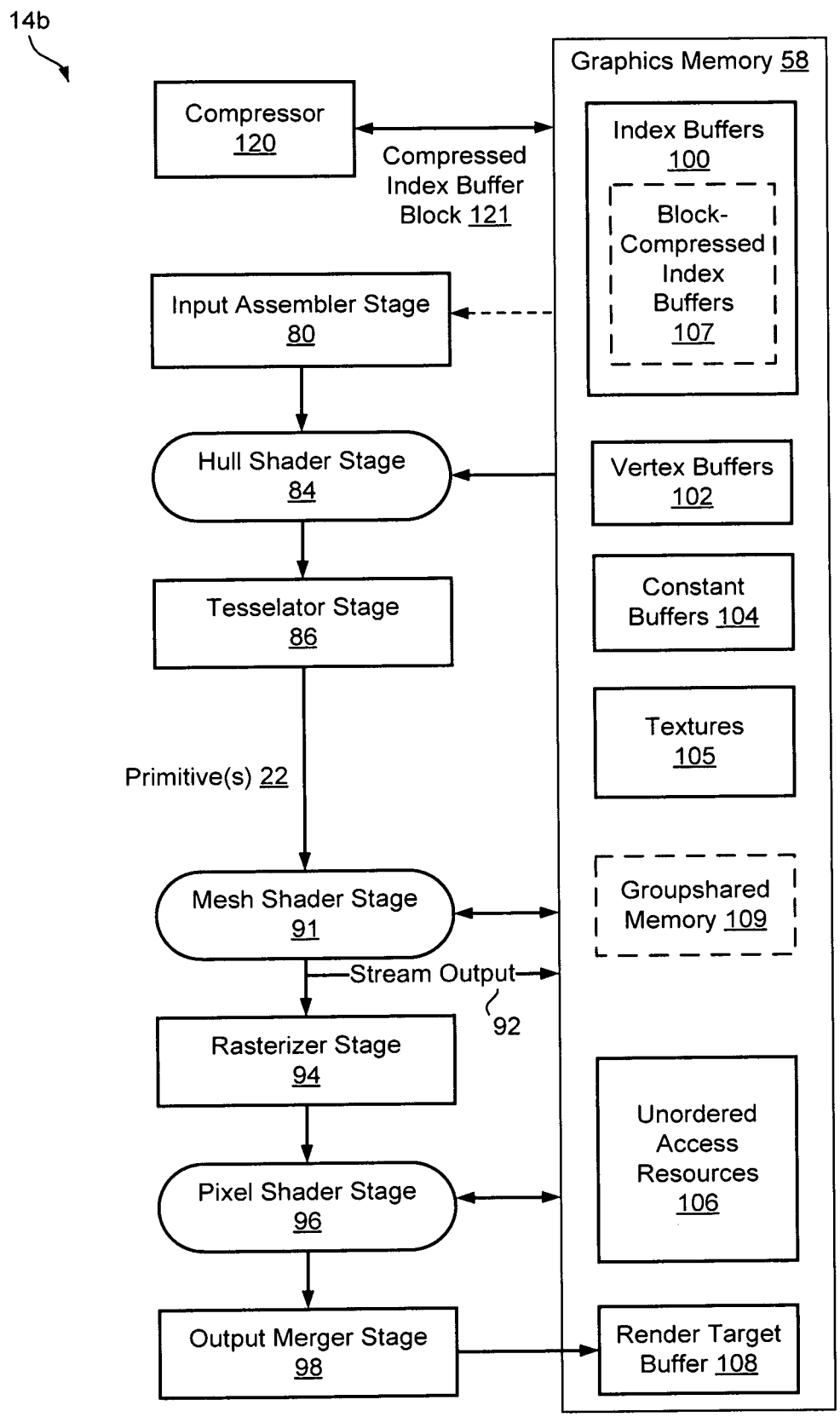

Referring to FIGS. 2A and 2B, for instance, in one example, GPU 12 may include or otherwise be in communication with compressor 120, which may be configured to compress mesh information of image 24, such as primitives, indices, and/or connectivity information, into one or more compressed index buffer blocks 107. In some aspects, the compressor 120 may be at least one of entirely separate from the GPU 12 (e.g., and on another computer entirely), running on the same computer as the GPU 12, but still separate from it, running as a shader program on the GPU 12, or a hardware component separate from, or part of the GPU 12.

In some implementations, compressor 120 may compress an entirety of index buffer 100. Further, the original index buffer (e.g., which may comprise 'N' unique indices and 'M' primitives) may be compressed in a way that is tuned for a piece of hardware with a threadgroup size of 'P' threads. The resulting block-compressed index buffer may be comprised of at least (N/P) blocks or (M/P) blocks, (whichever is greater), where each block contains information for roughly 'P' indices and 'P' primitives.

Additionally, in some implementations, some indices may appear in multiple index buffer chunks, and as such, it may be desirable that each unique index may appear in a single block no more than once. Accordingly, compressor 120 may arrange index and vertex data such that it may readily be fetched into a single wave or threadgroup. Further, each block within a compressed index buffer may have the same size, enabling efficient look up. For instance, a threadgroup or wave "X" may read block #X out of the index buffer, which may be X* "size of block" bytes into the index buffer 100. That block may contain all the information that threadgroup needs to generate all the primitives mentioned in that block.

GPU 12 may be configured to control execution of compressor 120 to generate the compressed index buffer blocks 107, and to implement one or more stages of an example logical graphics pipeline 14a, 14b that may perform index buffer block decompression. In an implementation, one or more of the various stages may be programmable, for instance, to unpack and/or decompress a compressed buffer index block. This programmability makes graphics pipeline 14a, 14b extremely flexible and adaptable. The features of the compressor 120 as well as the purpose of each of the stages is now described in brief below, and additional functionality will be further described with respect to subsequent figures. Also, it should be noted that in an implementation, common shader cores may be represented by the rounded rectangular blocks.

Additionally, the compressor 120 may also rearrange vertices within the vertex buffer 102, such that indices pointing to that vertex buffer 102 can be more efficiently delta-compressed, and also to improve cache coherency and memory controller efficiency when fetching batches of vertex data.

Graphics memory 58 may include one or more index buffers 100, which contain integer offsets into vertex buffers 102 and are used to render primitives 22 more efficiently. Each index buffer 100 contains a sequential set of indices; each index is used to identify a vertex in a vertex buffer.

For example, compressor 120 may be configured to perform index buffer block compression in an offline state (e.g., outside of the shader stages, and/or outside of the logical graphics pipeline 14a, 14b) to form compressed index buffer blocks 107 including condensed (e.g., reduced in data size) mesh information of a given mesh. Initially, compressor 120 may assign a number 'T' which may to represent a block size for use in the index buffer block compression. In some implementations, the number 'T' may represent a block size in triangles, such as but not limited to a number in the range of 32-256. In some implementations, the number 'T' may be hardware dependent. Compressor 120 may then reorder the vertices such that indices are linearly increasing. That is, the index buffers 100 may store or otherwise include a number of indices each corresponding to a unique vertex of a mesh. However, the vertices, or more specifically, the indices as stored within the index buffers 100 may not be ordered in any particular format. Accordingly, compressor 120 may reorder these vertices in an increasing order.

Compressor 120 may then select or otherwise determine an index compression scheme so as to store a number of bits per index (e.g., 8, 10, 16, or 32 bits). In particular, compressor 120 may iterate all primitives (e.g., triangles) of the mesh and for each primitive determine the minimum index, the maximum index, and the delta/difference between the minimum index and the maximum index. Compressor 120 may subsequently determine the maximum delta/difference for all primitives in the mesh and determine a number of bits that may be utilized to represent the maximum delta/difference.

In some implementations, compressor 120 may set a limit on the index size. Accordingly, compressor 120 may split or divide the mesh into chucks or pieces such that the number of vertices in a chuck or piece fits into the index.

Compressor 120 may iterate through the primitive mesh such that each primitive of the mesh is processed in order of indices. Specifically, compressor 120 may peel off or select a primitive and store the primitive in a list for a current index buffer block 107. Compressor 120 may continue to select (e.g., sequentially) primitives until the number of selected primitives corresponds to the number 'T'. Compressor 120 may then process reuse for the index buffer block.

For example, a reuse procedure may identify overlapping or redundant indices within the selected primitives for the particular index buffer block. The overlapping or redundant indices may not be included as part of the reuse output, which may instead output the unique indices. Rather, connectivity information that indicates where in a sequence of indices the redundancies occurred may be stored, and/or the connectivity information identifies which indices make up each triangle. As such, reuse may generate a smaller or the same list of indices per block.

Compressor 120 may determine the minimum index of all indices of all primitives of the block. As such, compressor 120 may form the index buffer block 107 based on the determined information including the number of primitives in the index buffer block, the number of indices after reuse in the block (e.g., the unique indices), a minimum value of all indices, all indices after reuse biased to the minimum index and fitted into the compression scheme, and/or connectivity information as an array of a number of bytes per primitives. As such, compressor 120 may provide compressed indices in index buffer block 107 and may perform faster reuse externally from any one of the shader stages. Compressor 120 may store the index buffer blocks 107 in graphics memory 58, e.g., in index buffers 100, for subsequent retrieval by any one or more of the shader stages of the logical pipeline 14a, 14b.

Further, GPU 12 may execute and/or utilize one or more shader stages to unpack the mesh information from the compressed index buffer blocks 107.

In some implementations, such as in the example of FIG. 2A, each index buffer block 107 may be read by a compute shader 92. For example, the logical pipeline 14a may consume geometry via index buffers 100 and vertex buffers 102. Therefore, a pre-cull stage such computer shader 92 may both read and write indices. Accordingly, compute shader 92 may be configured to read block compressed indices 107, processes vertices and triangles, and then may write normal indices into another buffer that the input assembler 80 consumes. By doing so, more triangles may be culled per clock cycle than in the fixed function hardware.

For example, compute shader 92 may, during a vertex phase, be configured to read one compressed index from index buffer block 107 per shader lane. That is, for each compressed index, one shader lane (e.g., also referred to as a thread) may read one compressed index. Compute shader 92 may then reconstruct the original index from the compressed index. Compute shader 92 may then read the vertex position associated with the original index. The vertex position may then be transformed according to a transform function by the compute shader 92. Compute shader 92 may store the transformed position in groupshared memory 109 along with the original index.

During the subsequent primitive phase, compute shader 92 may read a number of bytes (e.g., 3 bytes) of connectivity information per shader lane. Compute shader 92 may then read the transformed vertices out of groupshared memory 109 and perform culling. If a primitive survives culling, then the three original indices associated with the primitive are written out into the output index buffer for input assembler 80 consumption.

The input assembler stage 80 obtains indices-related data, such as from the index buffers 100 and/or supplies data (triangles, lines, points, and indexes) to the pipeline. The IA stage may assemble vertices into several different primitive types (such as line lists, triangle strips, or primitives).

The vertex shader stage 82 processes vertices, typically performing operations such as transformations, skinning, and lighting. Vertex shader stage 82 takes a single input vertex and produces a single output vertex.

The hull shader stage 84, a tessellator stage 86, and a domain-shader 88 stage comprise the tessellation stages.

The tessellation stages convert higher-order surfaces to triangles, e.g., primitives, for rendering within logical graphics pipeline 14a, 14b, and 14c. Further, the index compression scheme may also be part of, or operate in conjunction with, the tessellation stages. For example, the compressed index buffer blocks may cover N indices and M patches, for P threads in a threadgroup/wave.

The geometry shader stage 90 optionally (e.g., this stage can be bypassed) processes entire primitives 22. Its input may be a full primitive 22 (which is three vertices for a triangle, two vertices for a line, or a single vertex for a point), a quad, or a rectangle. In addition, each primitive can also include the vertex data for any edge-adjacent primitives. This could include at most an additional three vertices for a triangle or an additional two vertices for a line. The geometry shader stage 90 also supports limited geometry amplification and de-amplification. Given an input primitive 22, the geometry shader can discard the primitive, or emit one or more new primitives.

The stream-output stage 92 streams primitive data from graphics pipeline 14a, 14b to graphics memory 58 on its way to the rasterizer. Data can be streamed out and/or passed into a rasterizer stage 94. Data streamed out to graphics memory 58 can be recirculated back into graphics pipeline 14a, 14b as input data or read-back from the CPU 34 (FIG. 1).

The rasterizer stage 94 clips or culls primitives (e.g., removes primitives from processing when the primitives are on surfaces that are not viewable in image 24, such as a back or bottom surface), prepares primitives for a pixel shader stage 96, and determines how to invoke pixel shaders. Additionally, the rasterizer stage 94 performs fine scan conversions and determines pixel sample positions covered by the fragments.

The pixel shader stage 96 receives interpolated data for primitives and/or fragments and generates per-pixel data, such as color and sample coverage masks.

The output merger stage 98 combines various types of pipeline output data (pixel shader values, depth and stencil information, and coverage masks) with the contents of the render target 44 (FIG. 1) and depth/stencil buffers to generate the final result of graphics pipeline 14a, 14b.

Also, as discussed above and as illustrated in FIGS. 2A and 2B, graphics pipeline 14a, 14b may operate in conjunction with graphics memory 58 for exchanging and storing data. For example, graphics memory 58 may include one or more vertex buffers 100 that each contains the vertex data used to define geometry of image 24 (or other images). Vertex data includes position coordinates, color data, texture coordinate data, normal data, and so on. The simplest example of vertex buffer 100 is one that only contains position data. More often, vertex buffer 100 contains all the data needed to fully specify 3D vertices. An example of this could be vertex buffer 100 that contains per-vertex position, normal and texture coordinates. This data is usually organized as sets of per-vertex elements.

Graphics memory 58 may also include one or more constant buffers 104 that allows an efficient supply of shader constants, shader data, and/or any other shader resources to graphics pipeline 14a, 14b. Further, constant buffer 104 can be used to store the results of the stream-output stage 92. Moreover, graphics memory 58 may include one or more texture buffers or textures data 105, such as bitmaps of pixel colors that give an object the appearance of texture.

Additionally, graphics memory 58 may include one or more unordered access view resources 106 (which includes buffers, textures, and texture arrays—without multisampling). Unordered access resources 106 allow temporally unordered read/write access from multiple threads. This means that this resource type can be read/written simultaneously by multiple threads without generating memory conflicts through the use of certain defined functions.

Moreover, graphics memory 58 may include one or more render target buffers 108, which contain the rendered target or drawing of each pixel 32 of image 24 produced by graphics pipeline 14a, 14b.

Figure 2C:
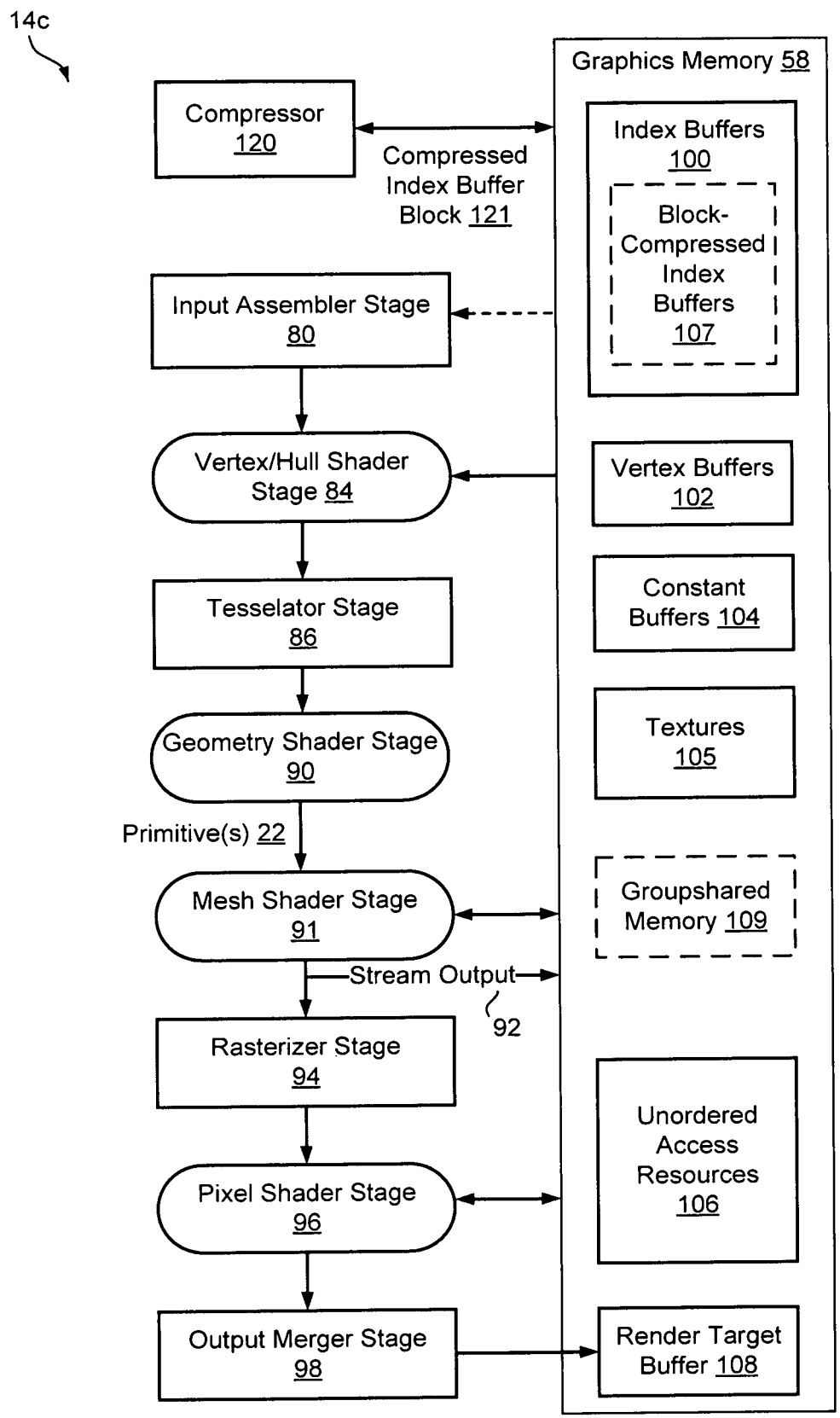

In some implementations, referring to FIGS. 2B and 2C, each index buffer block 107 may be read by a mesh shader stage 91. For example, mesh shader stage 91 may be a combination of any one or more of vertex shader stage 82, domain shader stage 88, and/or geometry shader stage 90. As such, the implementation according to FIG. 2B may have an understanding of compressed indices in the input assembler 80. Accordingly, logical pipeline 14b may not read and write indices. Further, in some implementations, when tessellation is enabled (e.g., in FIG. 2C), block index decompression may be performed in the input assembler and/or vertex shader stages. Additionally, when tessellation is enabled, the vertex shader stage may get merged with the hull shader stage, rather than with the geometry shader stage. When tessellation is disabled (e.g., in FIG. 2B), then the block index decompression may occur in the mesh shader stage.

During a vertex phase, mesh shader stage 91 may read the vertex position of a compressed index based on the original index reconstructed by the IA. Further, mesh shader stage 91 may transform the vertex position according to a transform function. Mesh shader stage 91 may store position in groupshared memory 109 along with the original index.

Mesh shader stage 91 may, during the primitive phase, read the connectivity information prepared by the input assembler 80. Mesh shader stage 91 may further read the transformed vertices out of groupshared memory 109. Additionally, mesh shader stage 91 may perform culling and if a primitive survives, then mesh shader stage 91 may indicate it as visible for the subsequent hardware. Further, each surviving vertex may be marked or indicated as such in groupshared memory 109.

During the attribute phase, mesh shader stage 91 may, for all surviving vertices output the vertex position, read the attributes from the vertex buffer 102, transform the attributes according to a transform function, and output the surviving transformed attributes. Subsequently, logical pipeline 14b may proceed to the rasterizer stage 94.

Further, in some implementations, although not illustrated, graphics memory 58 may include a primitive buffer configured to store primitives. For example, the primitive buffer may store primitives that are per-primitive and not per-vertex. As such, in a related per-primitive mode, vertex-primitive shader lane mapping may be loaded from memory. The base and number of primitives may be packed and loaded to a general purpose register (GPR) containing indices to primitives. GPU 12 may then use these indices to manually load the vertex-primitive mappings from the primitive buffer.

Figure 3:
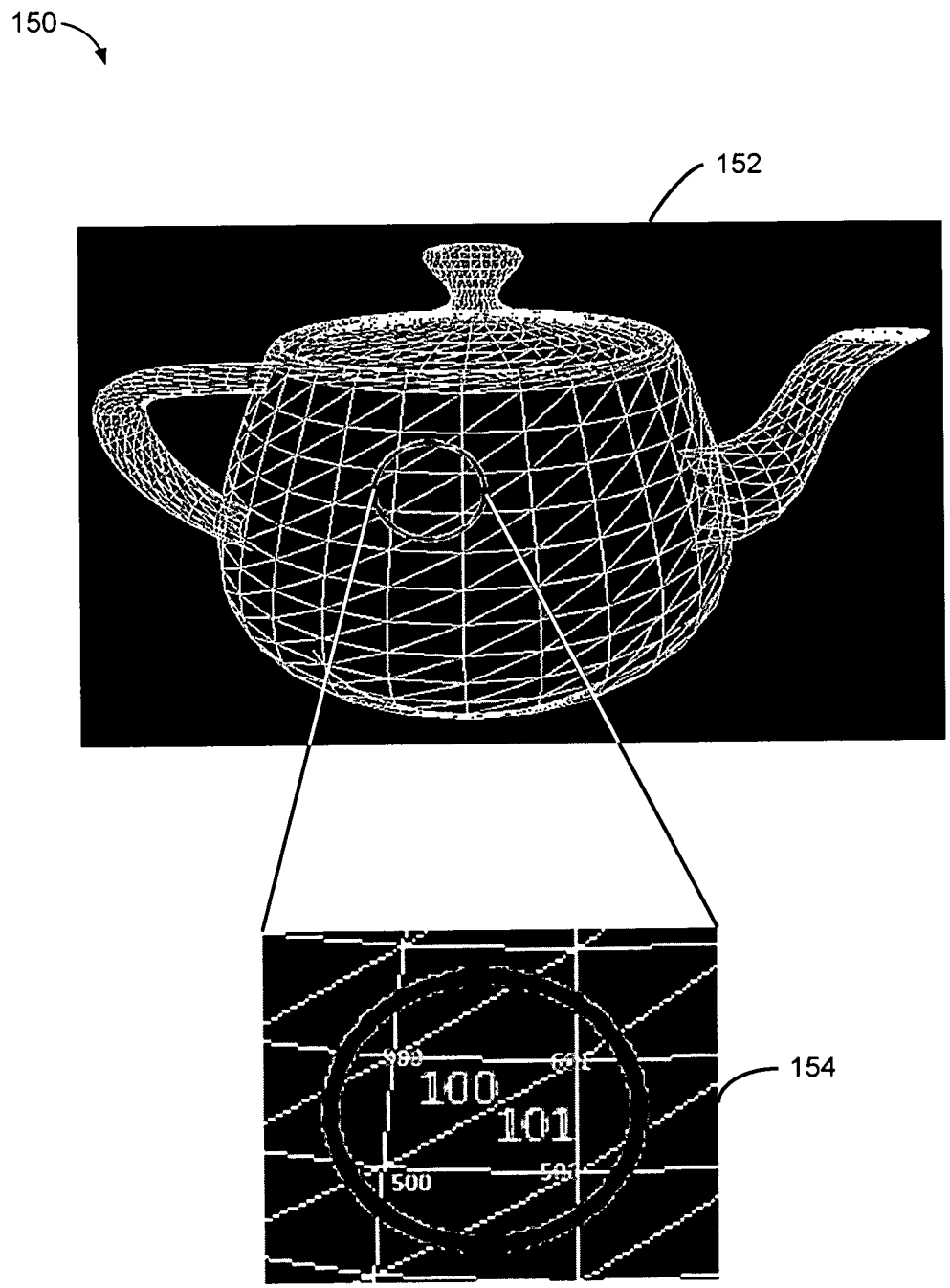
FIG. 3 is a conceptual diagram of vertices and triangles of an example mesh of an object for use in the index buffer block compression as described herein.

FIG. 3 illustrates a conceptual diagram of an example mesh 152 of image 24 that is to be rendered, e.g., a mesh of a teapot in this case, where the described index buffer block compression may be applied to at least a portion of mesh 152. For example, mesh 152 may be referred to as a triangle mesh. Each point may be called a vertex and connectivity information between points may define edges of the triangles. Further, the mesh 152 may be subjected to culling, e.g., where surfaces or faces that are facing away from the image or that are not in view in the image are removed from consideration for further processing. To determine which of these faces or triangles are facing away, the mesh 152 may be processed each time according to a different view. For example, for a closed mesh such as mesh 152, approximately half of all of the faces may be invisible (backface culled).

Additionally, vertices (identified in this case as vertices 500, 501, 600, and 601 of triangles 100 and 101) may be stored in vertex buffer 102. Therefore, each vertex may be identified by its index in that array. Connectivity information may be provided by a list of indices in index buffer 100. For example, mesh 152 may have or include an array of 'X' vertices, where each vertex has at least an XYZ position in three-dimensional space and optionally one or more additional parameters referred to as attributes.

In operation, compressor 120 may compress the mesh information associated with mesh 152, and notably the index information from an index buffer 100 in a block format. For example, compressor 120 may iteratively assemble each triangle of mesh 152 in an index buffer block 107. For example, referring to mesh portion 154, triangles 100 and 101 may satisfy the block size "T" in triangles value, which may be located or based on vertices 500, 501, 600, and 601.

Compressor 120 may determine a maximum difference of indices among the indices of triangles 100 and 101 is 101. As such, compressor 120 may select eight 8 bits for the index compression. Compressor 120 may trigger a new block and place triangles within it triangles 100 and 101. Subsequently, compressor 120 may process reuse and biasing. For example, connectivity (index buffer) between the triangles 100 and 101 may be shown in Table 1 below. As shown in Table 1, triangles 100 and 101 may be constructed or are formed using four vertices (e.g., 500, 501, 600, and 601). However, to define or construct two triangles, typically six vertices may be used, meaning two vertices may be shared or 'reused'. As such, to identify and remove the redundant indices, thereby forming a compressed index buffer block 107, compressor 120 may read through the index buffer in order (e.g., a portion of which may be represented by Table 1) and detect redundant indices.

TABLE 1

| Mesh 154 vertex indices arranged according to index value | | | | | | |
|---|---|---|---|---|---|---|
| Index | 300 | 301 | 302 | 303 | 304 | 305 |
| Vertex Index | 600 | 601 | 500 | 601 | 501 | 500 |

For example, with regard to Table 1, compressor 120 may read through Table 1 and identify indices 601 and 500 as duplicates and hence 'reused'. That is, the reuse input may be each of the original indices forming triangles 100 and 101 in order, e.g., 600, 601, 500, 601, 501, and 500. However, the reuse output may only be 600, 601, 500, and 501, as well as connectivity information in the form of an array identifying a sequential location of each unique index for each triangle, e.g., (0, 1, 2) (1, 3, 2).

Compressor 120 may then bias the unique indices for compression, which includes performing an arithmetic operation based on the minimum index 500 on the unique indices, resulting in biased indices 100, 101, 0, 1. Accordingly, an example index buffer block for triangles 100 and 101 may represented in Table 2 below. In some implementations, if there is a loss of data, compressor 120 may encode for the block that stores uncompressed indices instead.

TABLE 2

| Example index buffer block | |
|---|---|
| Size (in bytes) | Data |
| 2 bytes | NumTriangles = 2 |
| 2 bytes | NumIndices = 4 |
| 4 bytes | MinIndex = 500 |
| 1 byte (each) (8 bit encoding) | Indices: 100, 101, 0, 1 |
| 1 byte (each) | Connectivity: (0, 1, 2) (1, 3, 2) |

Figure 4:
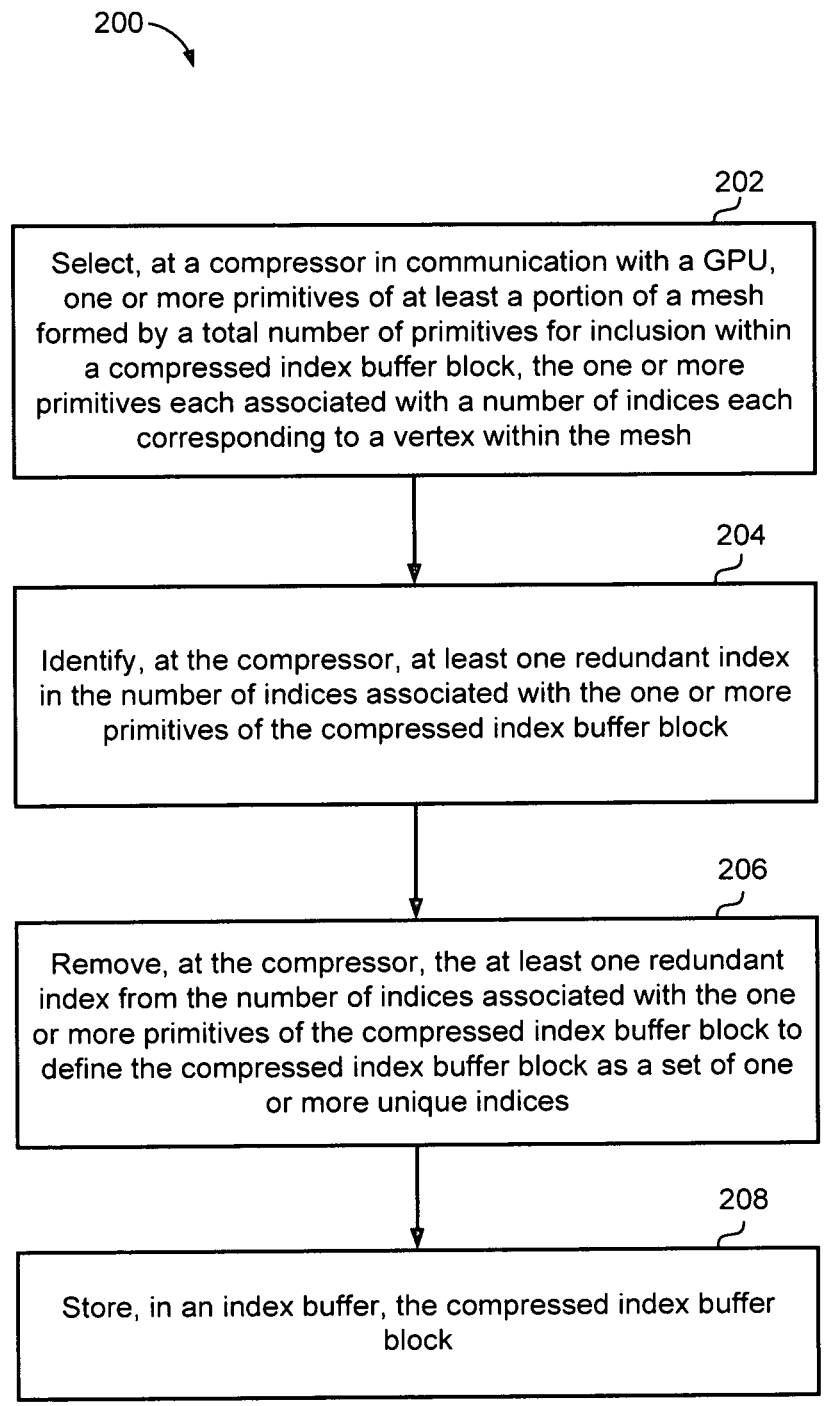
FIG. 4 is a flowchart of an example of a method of index buffer block compression according to the described implementations.

Referring to FIG. 4, the operation of computer device 10 having graphics pipeline 14a, 14b according to the described implementations is explained with reference to a method 200 of rendering graphics on computer device 10.

At block 202, method 200 may include selecting, at a compressor in communication with a GPU, one or more primitives of at least a portion of a mesh formed by a total number of primitives for inclusion within a compressed index buffer block, the one or more primitives each associated with a number of indices each corresponding to a vertex within the mesh. For example, as described herein, graphics processing system 72 (FIG. 1) may execute compressor 120 (FIGS. 1 and 2) to select one or more primitives of at least a portion of a mesh formed by a total number of primitives for inclusion within a compressed index buffer block, the one or more primitives each associated with a number of indices each corresponding to a vertex within the mesh.

At block 204, method 200 may determine, at the compressor, whether at least one redundant index has been detected in the number of indices associated with the one or more primitives of the compressed index buffer block. For example, as described herein, graphics processing system 72 (FIG. 1) may execute compressor 120 (FIGS. 1 and 2) to determine whether at least one redundant index has been detected in the number of indices associated with the one or more primitives of the compressed index buffer block. In some implementations, determining whether at least one redundant index has been detected in the number of indices may include identifying, at the compressor, at least one index that is repeated in the number of indices associated with the one or more primitives of the compressed index buffer block.

Method 200 may proceed to block 206 in accordance with a determination that at least one redundant index has not been detected in the number of indices. Specifically, at block 206, method 200 may preserve the at least one redundant index within the number of indices associated with the one or more primitives of the compressed index buffer block. For example, as described herein, graphics processing system 72 (FIG. 1) may execute compressor 120 (FIGS. 1 and 2) to maintain the at least one redundant index within the number of indices associated with the one or more primitives of the compressed index buffer block.

Method 200 may proceed to block 208 in accordance with a determination that at least one redundant index has been detected in the number of indices. Specifically, at block 208, method 200 may remove, at the compressor, the at least one redundant index from the number of indices associated with the one or more primitives of the compressed index buffer block to form the compressed index buffer block as a set of one or more unique indices. For example, as described herein, graphics processing system 72 (FIG. 1) may execute compressor 120 (FIGS. 1 and 2) to filter out the at least one redundant index from the number of indices associated with the one or more primitives of the compressed index buffer block to form the compressed index buffer block as a set of one or more unique indices.

At block 210, method 200 may include store, in an index buffer, the compressed index buffer block. For example, as described herein, graphics processing system 72 (FIG. 1) may execute compressor 120 (FIGS. 1 and 2) to store, in an index buffer 100 (FIG. 2), the compressed index buffer block 107 (FIG. 2). For instance, storing the compressed index buffer block may include storing at least one of a value corresponding to the one or more selected primitives, the one or more unique indices, a minimum index representing a smallest index value of the one or more unique indices, one or more unique indices adjusted by the minimum index, or connectivity information indicating a sequential order of the one or more unique indices for each of the one or more primitives within at least one array.

Further, although not shown, method 200 may include the vertex phase of the compute/mesh shader. For example, method 200 may include reading, from the compressed index buffer block in the index buffer, each of the one or more unique indices into a corresponding one or more shader lanes, determining each of the number of indices based on reading each of the one or more unique indices into the corresponding one or more shader lanes, transforming a vertex position associated with each of the one or more unique indices in the one or more shader lanes according to a first transform function, storing each of the transformed vertex positions in groupshared memory.

Additionally, although not illustrated, method 200 may include the triangle phase of the compute shader. Specifically, method 200 may include reading an array of connectivity information per shader lane, reading one or more transformed vertex positions from the groupshared memory, performing a cull procedure to omit at least a portion of the one or more primitives from the mesh, and providing the number of indices associated with one or more non-omitted primitives.

Further, although not shown, method 200 may include the triangle phase of the mesh shader. For instance, method 200 may include reading an array of connectivity information per shader lane, reading one or more transformed vertex positions from the groupshared memory per shader lane based on the connectivity information, performing a cull procedure to omit at least a portion of the one or more primitives from the mesh, the cull procedure resulting in one or more non-omitted primitives, and indicating at least one of one or more non-omitted primitives or at least one vertex associated with the one or more non-omitted primitives as non-omitted.

Moreover, although not shown, method 200 may include the attribute phase of the mesh shader. For instance, method 200 may include providing a position of each vertex associated with the one or more non-omitted primitives, reading at least one attribute for each vertex associated with the one or more non-omitted primitives, the at least one attribute representing one or more input values to a vertex shader from a vertex buffer, and transforming each of the at least one attribute according to a second transform function.

Although not shown, method 200 may select a bit size for the index compression. For example, method 200 may include determining a block value representing a block size of primitives falling within a block size range, arranging the number of indices within an index buffer in an increasing order, each of the one or more indices associated with a vertex of at least a portion of a mesh formed by a number of primitives, and selecting a compression scheme corresponding to a number of bits per index based at least on the one or more indices within the index buffer.

Although not shown, method 200 may iterate through the triangle mesh. For example, method 200 may include selecting, for a data block, one or more primitives from the number of primitives, the one or more selected primitives each associated with three indices from the one or more indices, determining that the one or more selected primitives correspond to the block value, and omitting, from the data block, at least one redundant index associated with at least one of the one or more primitives.

Further, although not shown, method 200 may process reuse for the index buffer block. For example, to omit at least one redundant index, method 200 may include reading, from the index buffer, one or more indices associated with a first primitive of the one or more primitives, reading, from the index buffer, one or more indices associated with a second primitive of the one or more primitives, determining that at least one index from the one or more indices associated with the second primitive corresponds to the at least one index from the one or more indices associated with the first primitive, omitting, from the data block, the at least one index associated with the second primitive based on determining that the at least one index from the one or more indices associated with the second primitive corresponds to the at least one index from the one or more indices associated with the first primitive, the at least one index associated with the second primitive corresponding to the at least one redundant index, identifying one or more unique indices following omission of the at least one index associated with the second primitive.

Although not shown, method 200 may determine connectivity information and the minimum index of all indices of all triangles included as part of the index buffer block. For example, method 200 may include determining connectivity information for the one or more selected primitives, the connectivity information including a distinct array for each of the one or more selected primitives having three values each corresponding to a location of at least one unique index of the one or more unique indices along a sequential order, and identifying a minimum index from each of the one or more primitives of at least the portion of the mesh.

In addition, although not shown, method 200 may select an index compression scheme. For instance, method 200 may include determining a minimum index, a maximum index, and a difference value between the minimum index and the maximum index for each of the one or more primitives of at least the portion of the mesh, selecting a maximum difference value from the difference values for each of the one or more primitives, and determining a minimum number of bits used for representing the maximum difference value, the minimum number of bits corresponding to the number of bits per index of the compression scheme. Further, the compressed index buffer block may be stored according to an index compression scheme.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., computer device 10), which can be a wired device or a wireless device. Such devices may include, but are not limited to, a gaming device or console, a laptop computer, a tablet computer, a personal digital assistant, a cellular telephone, a satellite phone, a cordless telephone, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various features have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a computer device (such as, but not limited to, a game console). In the alternative, the processor and the storage medium may reside as discrete components in a user terminal. Additionally, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with implementations disclosed herein.

What is claimed is:

1. A method of index buffer block compression at an application program interface (API), comprising:
   determining whether at least one redundant index has been detected in a number of indices associated with a one or more primitives of a compressed index buffer block;
   in accordance with a determination that at least one redundant index has been detected in the number of indices, removing the at least one redundant index from the number of indices associated with the one or more primitives to form the compressed index buffer block as a set of one or more unique indices;
   storing, in an index buffer, the compressed index buffer block; and
   selecting a compression scheme corresponding to a number of bits per index based at least on the one or more indices within the index buffer,
   wherein selecting the compression scheme includes:
   determining a minimum index, a maximum index, and a difference value between the minimum index and the maximum index for each of the one or more primitives of at least a portion of a mesh formed by a total number of primitives for inclusion within the compressed index buffer block;

selecting a maximum difference value from the difference values for each of the one or more primitives; and determining a minimum number of bits used for representing the maximum difference value, the minimum number of bits corresponding to the number of bits per index of the compression scheme.

2. The method of claim 1, further comprising selecting one or more primitives of at least the portion of the mesh formed by the total number of primitives for inclusion within the compressed index buffer block, the one or more primitives each associated with a number of indices each corresponding to a vertex within the mesh, wherein storing the compressed index buffer block includes storing at least one of:

a value corresponding to the one or more selected primitives, the one or more unique indices, a minimum index representing a smallest index value of the one or more unique indices, one or more unique indices adjusted by the minimum index, or connectivity information indicating a sequential order of the one or more unique indices for each of the one or more primitives within at least one array.

3. The method of claim 2, further comprising:

determining a block value representing a block size of primitives falling within a block size range; and arranging the number of indices within an index buffer in an increasing order, each of the one or more indices associated with a vertex of at least a portion of a mesh formed by a number of primitives.

4. The method of claim 3, further comprising:

selecting, for a data block, one or more primitives from the number of primitives, the one or more selected primitives each associated with three indices from the one or more indices;

determining that the one or more selected primitives correspond to the block value; and omitting, from the data block, at least one redundant index associated with at least one of the one or more primitives.

5. The method of claim 4, wherein determining whether at least one redundant index has been detected in the number of indices associated with the one or more primitives of the compressed index buffer block includes:

reading, from the index buffer, one or more indices associated with a first primitive of the one or more primitives;

reading, from the index buffer, one or more indices associated with a second primitive of the one or more primitives;

determining that at least one index from the one or more indices associated with the second primitive corresponds to the at least one index from the one or more indices associated with the first primitive;

omitting, from the data block, the at least one index associated with the second primitive based on determining that the at least one index from the one or more indices associated with the second primitive corresponds to the at least one index from the one or more indices associated with the first primitive, the at least one index associated with the second primitive corresponding to the at least one redundant index; and identifying one or more unique indices following omission of the at least one index associated with the second primitive.

6. The method of claim 5, further comprising:

determining connectivity information for the one or more selected primitives, the connectivity information including a distinct array for each of the one or more selected primitives having three values each corresponding to a location of at least one unique index of the one or more unique indices along a sequential order; and identifying a minimum index from each of the one or more primitives of at least the portion of the mesh.

7. The method of claim 6, wherein the compressed index buffer block is stored according to an index compression scheme.

8. The method of claim 1, further comprising:

reading, from the compressed index buffer block in the index buffer, each of the one or more unique indices into a corresponding one or more shader lanes;

determining each of the number of indices based on reading each of the one or more unique indices into the corresponding one or more shader lanes;

transforming a vertex position associated with each of the one or more unique indices in the one or more shader lanes according to a first transform function; and storing each of the transformed vertex positions in group-shared memory.

9. The method of claim 3, further comprising:

reading an array of connectivity information per shader lane;

reading one or more transformed vertex positions from the groupshared memory per shader lane based on the connectivity information;

performing a cull procedure to omit at least a portion of the one or more primitives from the mesh; and providing the number of indices associated with one or more non-omitted primitives.

10. The method of claim 3, further comprising:

reading an array of connectivity information per shader lane;

reading one or more transformed vertex positions from the groupshared memory;

performing a cull procedure to omit at least a portion of the one or more primitives from the mesh, the cull procedure resulting in one or more non-omitted primitives; and indicating at least one of one or more non-omitted primitives or at least one vertex associated with the one or more non-omitted primitives as non-omitted.

11. The method of claim 10, further comprising:

providing a position of each vertex associated with the one or more non-omitted primitives;

reading at least one attribute for each vertex associated with the one or more non-omitted primitives, the at least one attribute representing one or more input values to a vertex shader from a vertex buffer; and transforming each of the at least one attribute according to a second transform function.

12. The method of claim 1, wherein the API includes a mesh shader having at least two grouped shader stages including a vertex shader stage and a geometry shader stage.

13. The method of claim 1, wherein the number of primitives correspond to a number of triangles.

14. A computer device, comprising:

a memory; and at an application program interface (API) in communication with a graphics processing unit (GPU) in communication with the memory, wherein the GPU is configured to:
determine whether at least one redundant index has been detected in a number of indices associated with a one or more primitives of a compressed index buffer block;
in accordance with a determination that at least one redundant index has been detected in the number of indices, remove the at least one redundant index from the number of indices associated with the one or more primitives to form the compressed index buffer block as a set of one or more unique indices;
store, in an index buffer, the compressed index buffer block; and
select a compression scheme corresponding to a number of bits per index based at least on the one or more indices within the index buffer,
wherein selecting the compression scheme includes:
determine a minimum index, a maximum index, and a difference value between the minimum index and the maximum index for each of the one or more primitives of at least a portion of a mesh formed by a total number of primitives for inclusion within the compressed index buffer block;
select a maximum difference value from the difference values for each of the one or more primitives; and
determine a minimum number of bits used for representing the maximum difference value, the minimum number of bits corresponding to the number of bits per index of the compression scheme.

15. The computer device of claim 14, wherein the GPU is further configured to select one or more primitives of at least the portion of the mesh formed by the total number of primitives for inclusion within the compressed index buffer block, the one or more primitives each associated with a number of indices each corresponding to a vertex within the mesh, and
wherein storing the compressed index buffer block includes storing at least one of:
a value corresponding to the one or more selected primitives,
the one or more unique indices,
a minimum index representing a smallest index value of the one or more unique indices,
one or more unique indices adjusted by the minimum index, or
connectivity information indicating a sequential order of the one or more unique indices for each of the one or more primitives within at least one array.

16. The computer device of claim 14, further comprising:
read, from the compressed index buffer block in the index buffer, each of the one or more unique indices into a corresponding one or more shader lanes;
determine each of the number of indices based on reading each of the one or more unique indices into the corresponding one or more shader lanes;
transform a vertex position associated with each of the one or more unique indices in the one or more shader lanes according to a first transform function; and
store each of the transformed vertex positions in groupshared memory.

17. The computer device of claim 16, further comprising:
read an array of connectivity information per shader lane;
read one or more transformed vertex positions from the groupshared memory;
perform a cull procedure to omit at least a portion of the one or more primitives from the mesh; and
provide the number of indices associated with one or more non-omitted primitives.

18. The computer device of claim 16, further comprising:
read an array of connectivity information per shader lane;
read one or more transformed vertex positions from the groupshared memory;
perform a cull procedure to omit at least a portion of the one or more primitives from the mesh, the cull procedure resulting in one or more non-omitted primitives;
indicate at least one of one or more non-omitted primitives or at least one vertex associated with the one or more non-omitted primitives as non-omitted;
provide a position of each vertex associated with the one or more non-omitted primitives;
read at least one attribute for each vertex associated with the one or more non-omitted primitives, the at least one attribute representing one or more input values to a vertex shader from a vertex buffer; and
transform each of the at least one attribute according to a second transform function.

19. A non-transitory computer-readable medium storing computer-executable instructions executable by an application program interface for rendering graphics in a computer device, comprising:
instructions for determining whether at least one redundant index has been detected in an number of indices associated with an one or more primitives of an compressed index buffer block;
in accordance with a determination that at least one redundant index has been detected in the number of indices, instructions for removing the at least one redundant index from the number of indices associated with the one or more primitives to form the compressed index buffer block as a set of one or more unique indices;
instructions for storing, in an index buffer, the compressed index buffer block; and
instructions for selecting a compression scheme corresponding to a number of bits per index based at least on the one or more indices within the index buffer,
wherein the instructions for selecting the compression scheme includes:
instructions for determining a minimum index, a maximum index, and a difference value between the minimum index and the maximum index for each of the one or more primitives of at least a portion of a mesh formed by a total number of primitives for inclusion within the compressed index buffer block;
instructions for selecting a maximum difference value from the difference values for each of the one or more primitives; and
instructions for determining a minimum number of bits used for representing the maximum difference value, the minimum number of bits corresponding to the number of bits per index of the compression scheme.

20. The non-transitory computer-readable medium of claim 19, further comprising instructions for selecting one or more primitives of at least the portion of the mesh formed by the total number of primitives for inclusion within the compressed index buffer block, the one or more primitives each associated with a number of indices each corresponding to a vertex within the mesh, wherein storing the compressed index buffer block includes storing at least one of:
a value corresponding to the one or more selected primitives, the one or more unique indices,
a minimum index representing a smallest index value of the one or more unique indices,
one or more unique indices adjusted by the minimum index, or
connectivity information indicating a sequential order of the one or more unique indices for each of the one or more primitives within at least one array.

\* \* \* \* \*